United States Patent

Dobrowolski et al.

[11] Patent Number: 5,521,759
[45] Date of Patent: May 28, 1996

[54] OPTICAL FILTERS FOR SUPPRESSING UNWANTED REFLECTIONS

[75] Inventors: Jerzy A. Dobrowolski, Ottowa; Roger A. Kemp, Vancouver, both of Canada

[73] Assignee: National Research Council of Canada, Ottowa, Canada

[21] Appl. No.: 72,060

[22] Filed: Jun. 7, 1993

[51] Int. Cl.[6] .................................. G02B 1/10; G02B 27/00
[52] U.S. Cl. .................................. 359/585; 359/590; 359/885; 359/890; 359/601; 359/614; 348/834
[58] Field of Search .................................. 359/590, 585, 359/589, 601, 614, 609, 890, 885; 348/786, 834

[56] References Cited

U.S. PATENT DOCUMENTS

| | | | |
|---|---|---|---|
| 3,518,373 | 6/1970 | Cushera et al. | 359/590 |
| 3,679,291 | 7/1972 | Apfel et al. | 359/587 |
| 3,736,050 | 5/1973 | Bolum | 359/890 |
| 4,169,655 | 10/1979 | Jacobsson | 359/589 |
| 4,310,783 | 1/1982 | Temple et al. | 313/474 |
| 4,422,721 | 12/1983 | Hahn et al. | 359/585 |
| 4,515,442 | 5/1985 | Aron | 359/590 |
| 4,663,562 | 5/1987 | Miller et al. | 313/478 |
| 4,798,994 | 1/1989 | Rijpers et al. | 313/478 |
| 4,804,883 | 2/1989 | Müller et al. | 313/478 |
| 4,896,218 | 1/1990 | Vick | 358/253 |
| 4,990,824 | 2/1991 | Vriens et al. | 313/476 |
| 5,049,780 | 9/1991 | Dobrowolski et al. | 313/509 |
| 5,057,912 | 10/1991 | DeLeeuw et al. | 348/786 |
| 5,091,244 | 2/1992 | Bionard | 359/885 |
| 5,121,030 | 6/1992 | Schott | 359/885 |
| 5,138,222 | 8/1992 | Toide et al. | 348/786 |
| 5,164,858 | 11/1992 | Aguilera, Jr. et al. | 359/589 |
| 5,170,291 | 12/1992 | Szczybrowski et al. | 359/580 |
| 5,268,788 | 12/1993 | Fox et al. | 359/589 |

OTHER PUBLICATIONS

Ii, L. B. "High Contrast Filter", IBM Technical Disclosure Bulletin, vol. 12, No. 10, Mar. 1970.
Murphy, H. M. "High Contrast Optical Bandpass Filter" IBM Technical Disclosure Bulletin, vol. 16, No. 3, Aug. 1973.

Primary Examiner—Paul M. Dzierzynski
Assistant Examiner—John Juba, Jr.

[57] ABSTRACT

An optical filter is provided for suppressing unwanted reflections of background light when used with a display device such as a cathode ray tube or an electroluminescent screen, or in optical communication or surveillance. The filter has multiple thin layers including a first series of layers for suppressing reflections from its outer surface and a second series of layers constituting a bandpass interference filter. The first series of layers is arranged to suppress reflections over a broad wavelength band while the second series of layers allows transmittance over a relatively narrow wavelength passband within the broad wavelength band, resulting in improved contrast when the display is used in situations of high background light.

15 Claims, 6 Drawing Sheets

OPTICAL FILTERS FOR SUPPRESSING UNWANTED REFLECTIONS

BACKGROUND OF THE INVENTION

The present invention relates to optical filters for use with cathode ray tubes, electroluminescent screens and other display devices. Other applications are, for example, in optical communications and surveillance.

PRIOR ART

The legibility of a display depends on the contrast between adjacent active and inactive pixels. It is convenient to define a contrast ratio CR in the following way, $$CR=(L_{on}+R.I_{amb})/(L_{off}+R.I_{amb}). \quad (1)$$

where $L_{on}$, $L_{off}$ are the luminances of the active and inactive pixels, R is the resultant luminous reflectance of the display when viewed from the side of the observer, and $I_{amb}$ is the ambient illuminance. The resultant luminous reflectance of the display is composed of light reflected from the front surface and from all the other internal interfaces of the display that are reached by the ambient illuminance. In the past, to protect the viewer from the glare resulting from the term $R.I_{amb}$ in the above equation, a number of different approaches have been proposed. These include the use of various combinations of the following: louvres, screens, neutral, coloured or polarization filters placed in front of the display; antireflection coatings applied to its front surface; or intrinsic absorption in thin layers placed within the display structure in front of strongly reflecting interfaces, such as the white phosphor in a cathode ray tube or the aluminum grids in an electroluminescent screen. The design of display devices in which the materials of individual layers and their thicknesses are carefully selected to produce a low reflectance through the interference of electromagnetic radiation in thin films has also been previously described.

Another solution to the problem would be to place a narrow band filter in front of the display which would only pass the light emitted by the device and, at the same time, suppress unwanted reflections from the viewer's side. One prior art way of constructing bandpass filters is to make use of the intrinsic absorption of various chemical compounds, coloured glasses or organic dyes. Filters based on this principle do not have a strong reflection for the unwanted radiation. However, the transmission bands obtained in this way are not, as a rule, very narrow and the transition from the transmission to the rejection region is rather gradual. Furthermore, the wavelength of the transmission peak must correspond to the absorption characteristics of the material and cannot be selected at will.

Much narrower transmission bands centred accurately on the wavelength of interest can be achieved with the aid of interference filters. Absorption in the coating materials may also contribute to the desired effect. However, as a rule, in thin film interference filters much of the unwanted radiation is reflected back towards the source of light.

Up to the present, it is not known how to construct bandpass filters that, at the same time, have a narrow band width and very little reflection towards an outside light source. Some of the radiation reflected by presently known interference bandpass filters could be removed with the aid of a short wavelength absorption cutoff filter. Unfortunately, no corresponding comprehensive set of long wavelength cut-off filters exists, so there is no easy way with the present technology to deal with the radiation of wavelengths longer than that of the bandpass.

SUMMARY OF THE INVENTION

The invention relies on combining interference in thin films with the intrinsic absorption of coating materials to produce "black" transmission bandpass filters. This effect is achieved with relatively thin filters which will not affect the transmitted beam to the extent that thick absorption filters would. Such filters may enhance the contrast of monochrome display devices, in communications and in military equipment. They may also be designed for colour displays. The filters can be deposited directly onto a substrate constituted by the front surface of the display, or they may be deposited onto a separate transparent substrate that can be retrofitted to an existing device. Preferably, the one surface of the separate substrate which carries the multiple thin layers is the inner face, adjacent to the display device. In that case, for best results an additional antireflection coating on the outer face might be required.

In accordance with the present invention, in an optical filter for use with a display device, having an outer face for facing an observer and an inner face, the filter comprises multiple thin layers on one surface of a single substrate, the layers including a first series of layers whose main task is to suppress reflection over a broad spectral region and a second series of layers constituting a narrow band interference bandpass filter. The transmission at the transmission peak of the resulting filter is at least 20% of the incident radiation over a relatively narrow passband, whilst the reflectance is a fraction of that transmission.

BRIEF DESCRIPTION OF THE DRAWINGS

The invention will further be described with reference to the accompanying drawings, in which.

DETAILED DESCRIPTION

Figure 1B:
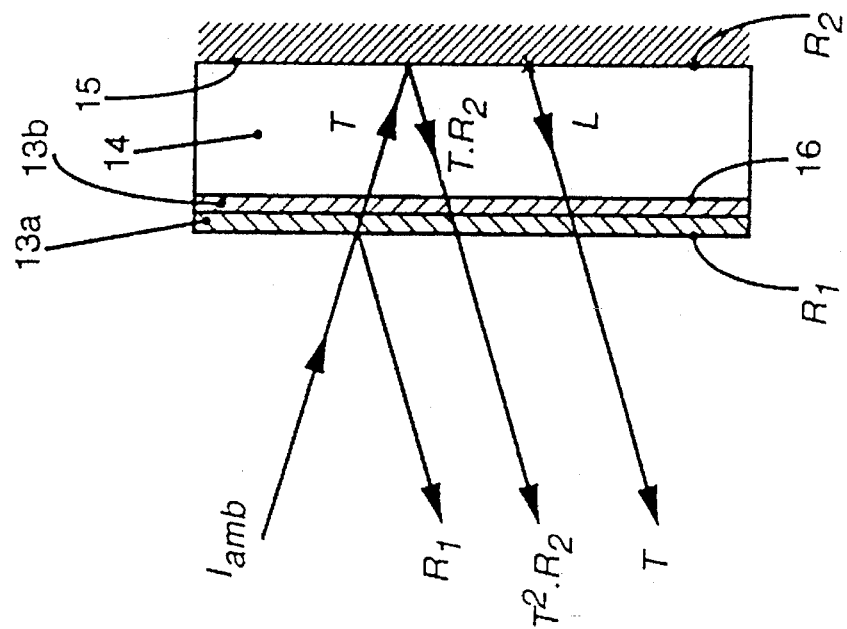
FIGS. 1A and 1B show a diagrammatic cross-section of the device, associated light rays and the fraction of the incident light propagating at different stages of the path. There are two cases: (A) the filter is deposited onto a separate substrate which is then cemented to the display which constitutes the substrate; (B) it is applied directly to the display.
Figure 1A:
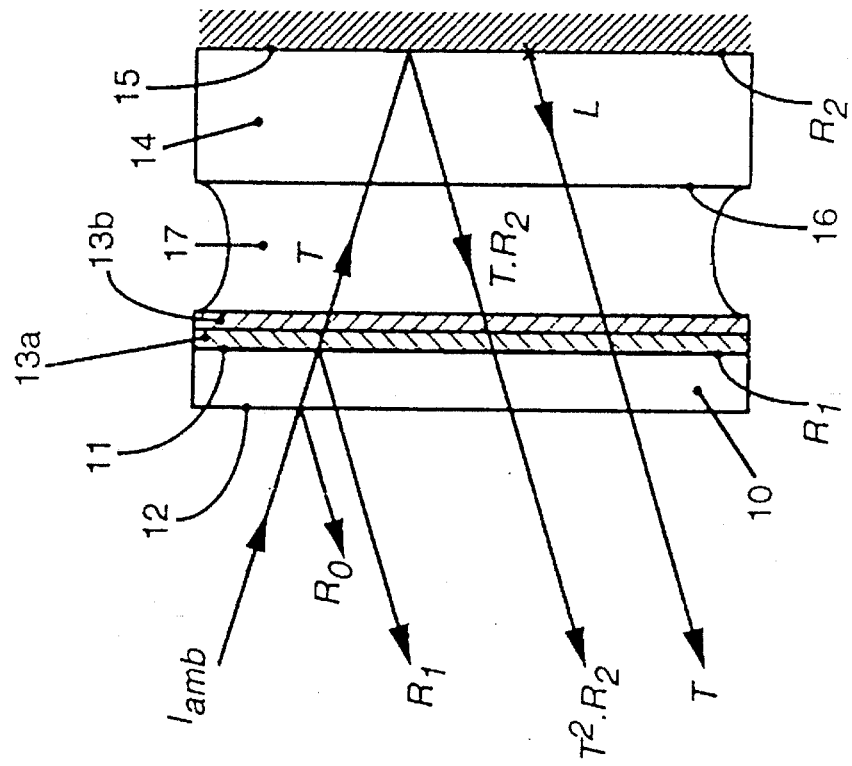

FIG. 1A shows diagrammatically an arrangement in which an optical filter 10 is cemented with a refractive index matching optical cement 17 to the front surface 16 of a display device screen 14. Ambient light (shown as $I_{amb}$) falls onto the filter 10. A fraction $R_0$ of the light is reflected from the front surface 12. In general, an additional fraction $R_1$ will be reflected at the interface 11 if it carries a thin film system 13. The filter transmits an amount T of the incident light which then proceeds towards the display 14. Because of the refractive index matched cement, the interface 16 does not reflect a significant amount of light. However, the surface 15 is coated with a phosphor, or carries an electroluminescent or liquid crystal display. In any of these cases the reflectance $R_2$ can be as high as 0.9. If all the reflections are specular, and if the illuminance of the ambient light is $I_{amb}$, the amount of light that will reach the observer is $(R_0+R_1+T^2R_2).I_{amb}$. If L is the emitted luminance of the display device, the fraction that will reach the observer will be TL.

The filter 10 in FIG. 1A is made of glass, fused quartz or a suitable plastic material. In the inventive filter it acts as a single transparent substrate for two sets of thin films indicated as 13a and 13b on its inner surface 11, facing screen 14. The functions of these sets of films are to suppress internal reflection $R_1$ at the interface 11 and to act as a narrow band interference filter, respectively.

There is one less surface to consider when the thin film system 13 is deposited directly onto the front surface 16 of the display screen 14 (FIG. 1B). The ambient and emitted light reaching the observer in this case will be $(R_1+T^2R_2).I_{amb}$ and TL, respectively. This diagram also applies when the layers 13 are applied to the surface 12 of the substrate 10 of FIG. 1A, and the filter is cemented with a refractive index matched cement to the front surface 16 of the display screen. From the point of view of optical performance, there is little difference between the embodiments of FIGS. 1A and 1B—$R_0$ is equal to about 0.04 for most likely materials. This small reflection can be reduced still further by the application of an antireflection coating to surface 12 in FIG. 1A. For the sake of clarity the reflection of light approaching the multilayer 13 from the display device has not been indicated.

The general operation of such a combination of films will now be discussed in relation to prior art devices, with reference to FIGS. 2–4.

FIGS. 2A–2D correspond to the prior art in which the filter 10 is, for example, a neutral density glass absorption filter and the films 13 are absent. FIG. 2A represents the spectral transmittance of a filter which absorbs roughly half of the incident light on a single pass (T=0.5). Also shown are the reflectances $R_1$ and $R_2$ of the surfaces 12 and 15. In this and the following two figures it has been assumed, for simplicity, that surface 12 has been perfectly antireflection coated ($R_0$=0.0), that $R_2$=0.9 and that the energy spectrum of the ambient illuminance is constant throughout the spectral interval shown. In FIG. 2A the value of $R_1$ is also 0.0 because of the use of a refractive index matching cement. The product $T.R_2$ will therefore be of the order of 0.45 throughout the spectrum (FIG. 2B). After the second pass through the absorption filter the average value of the product $T^2R_2$ will be 0.22 (FIG. 2C). The value of $(R_0+R_1+T^2R_2)$ shown in FIG. 2D is therefore also 0.22. This then is the fraction of the ambient illuminance that reaches the observer and it corresponds to the quantity R in Equation 1.

Figures 2, 3, 4:
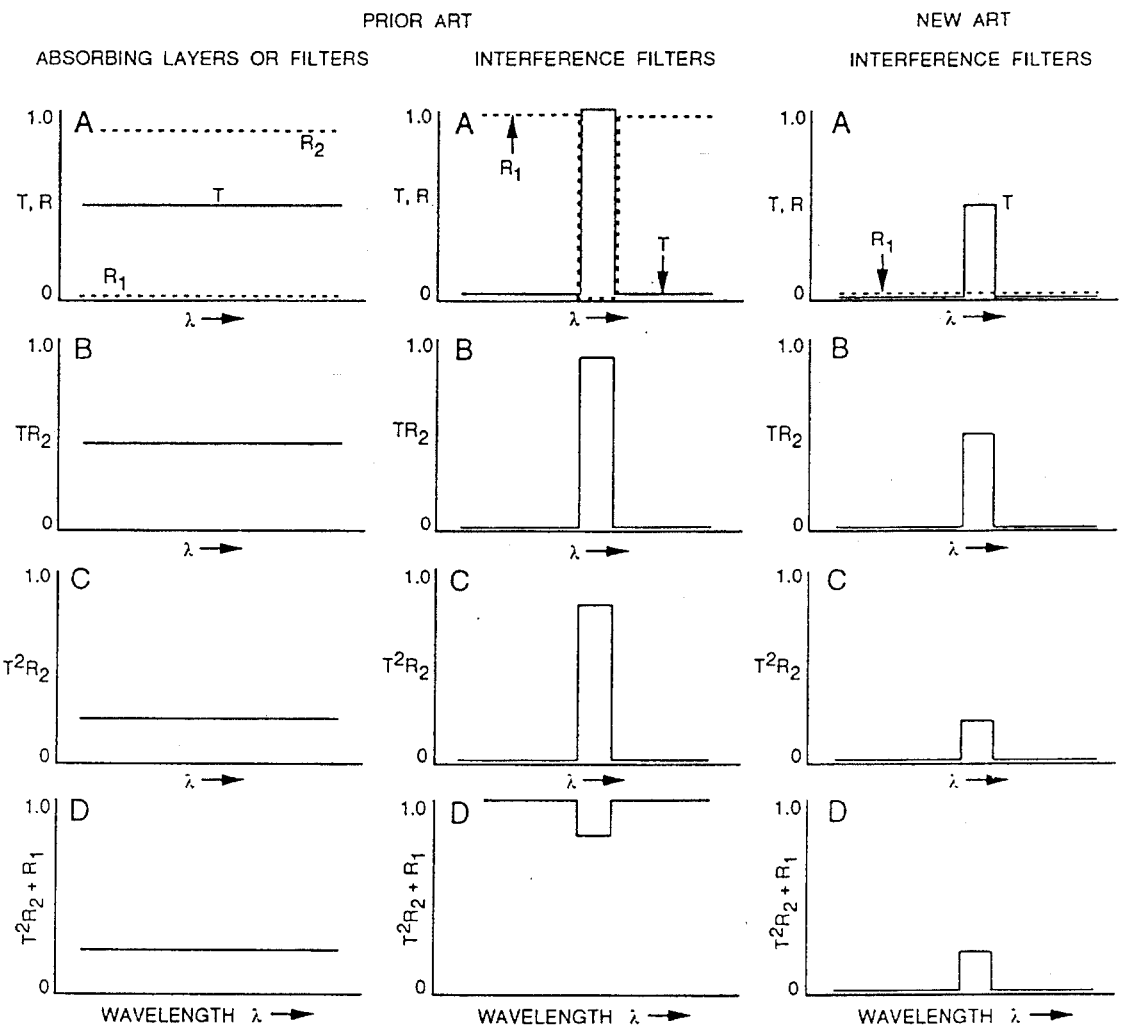
FIGS. 2A–2D show series of graphs illustrating the light transmittances and reflectances with a conventional coloured glass filter.
FIGS. 3A–3D show similar graphs for a known type of interference filter.
FIGS. 4A–4D show similar graphs for the interference filters of this invention.
Figure 5:
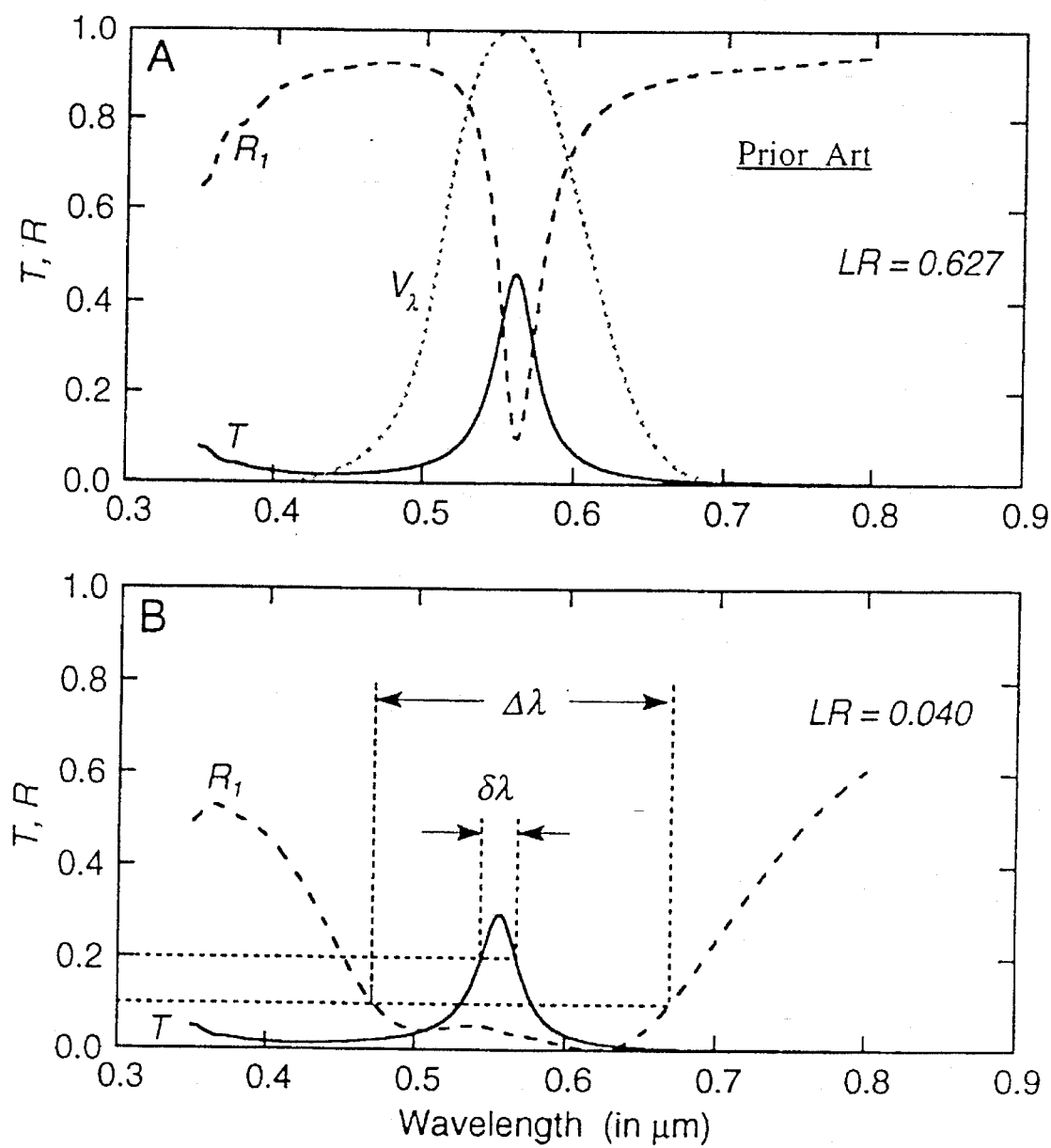
FIGS. 5A and 5B show, respectively, the prior art and inventive versions of the filters based on single cavity metal-dielectric bandpass filters.
Figure 6:
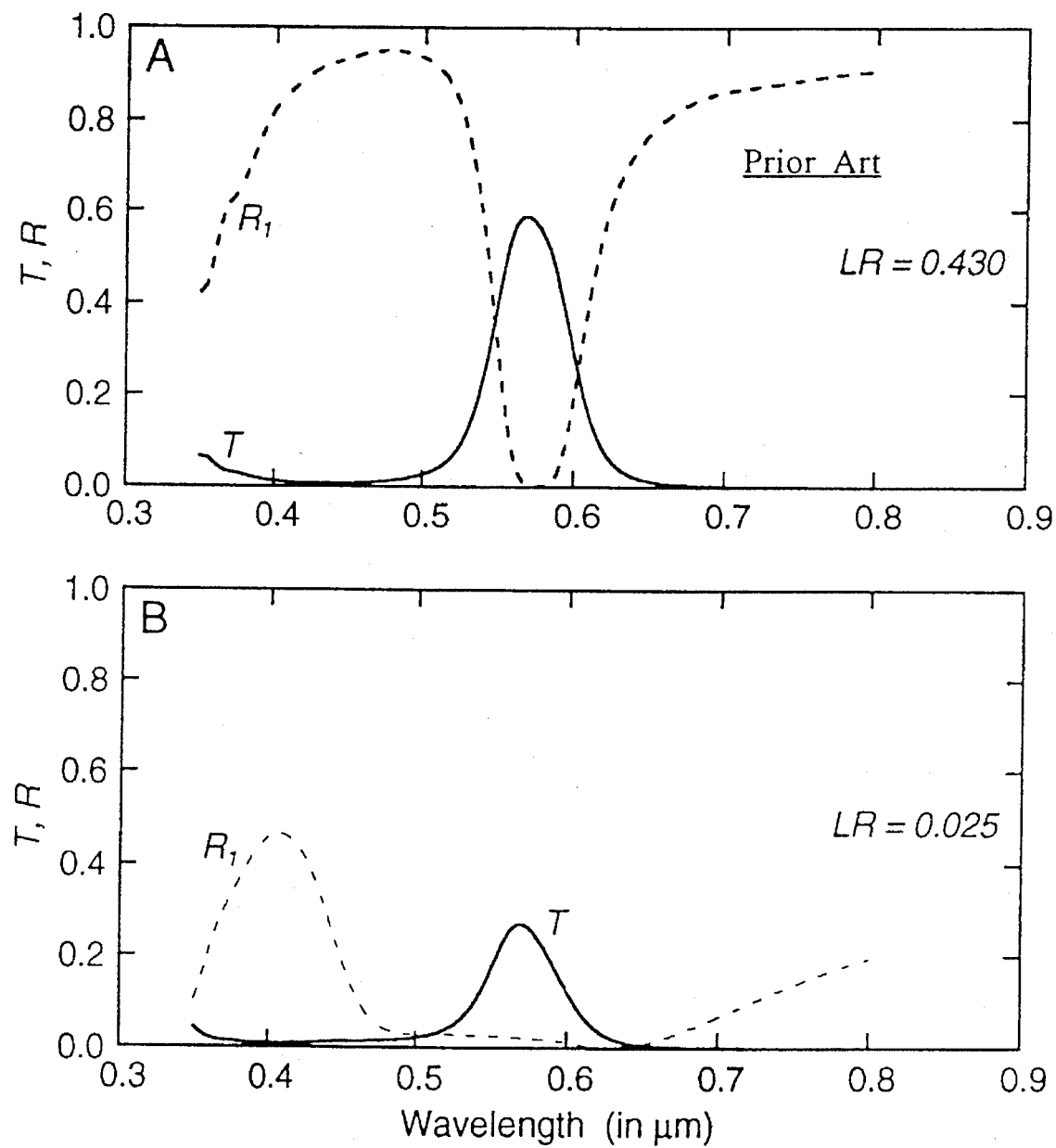
FIGS. 6A and 6B show, respectively, the prior art and inventive filters based on two cavity metal-dielectric bandpass filters.
Figure 7:
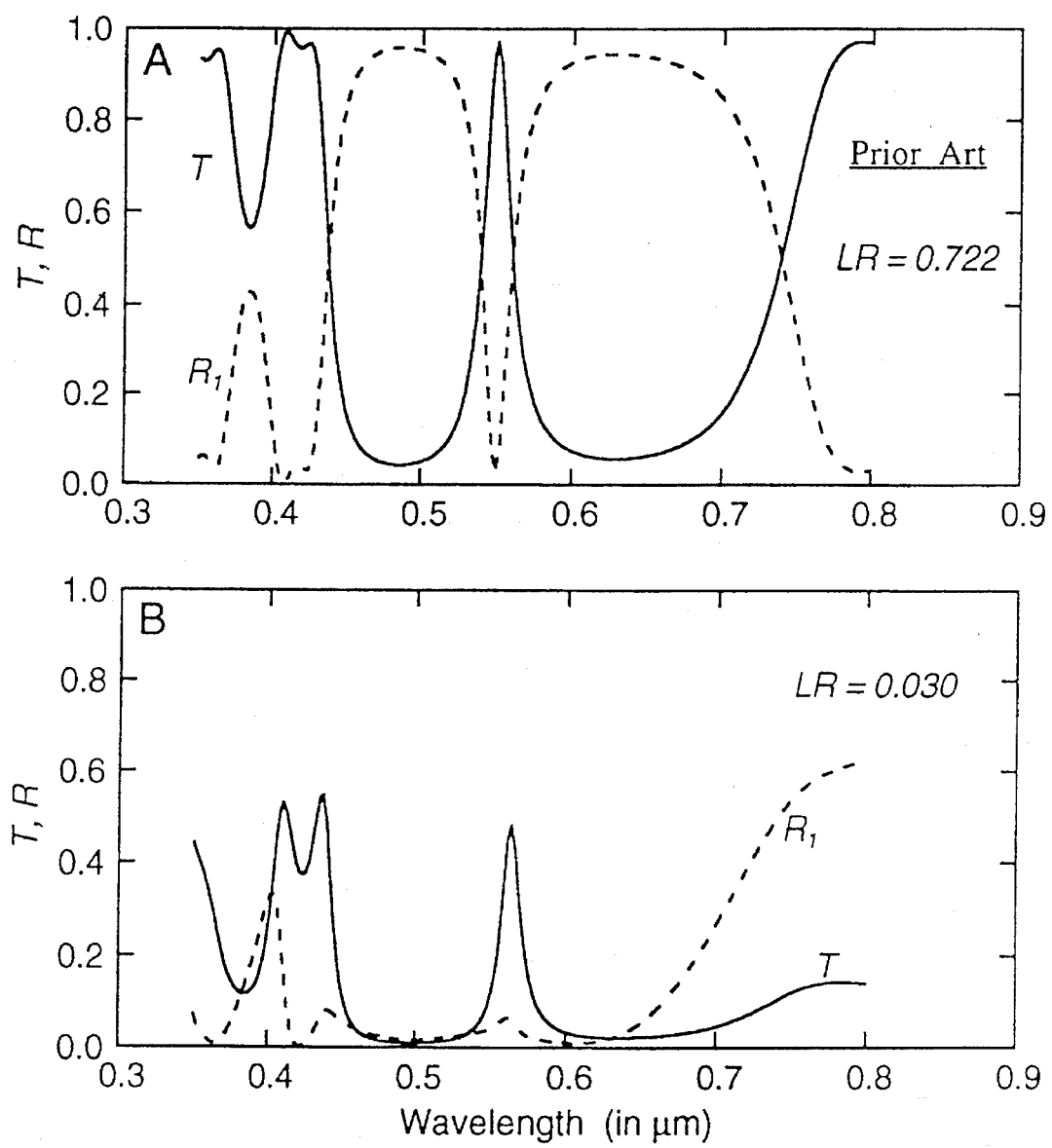
FIGS. 7A and 7B show, respectively, the prior art and inventive filters based on single cavity all-dielectric bandpass filters.
Figure 8:
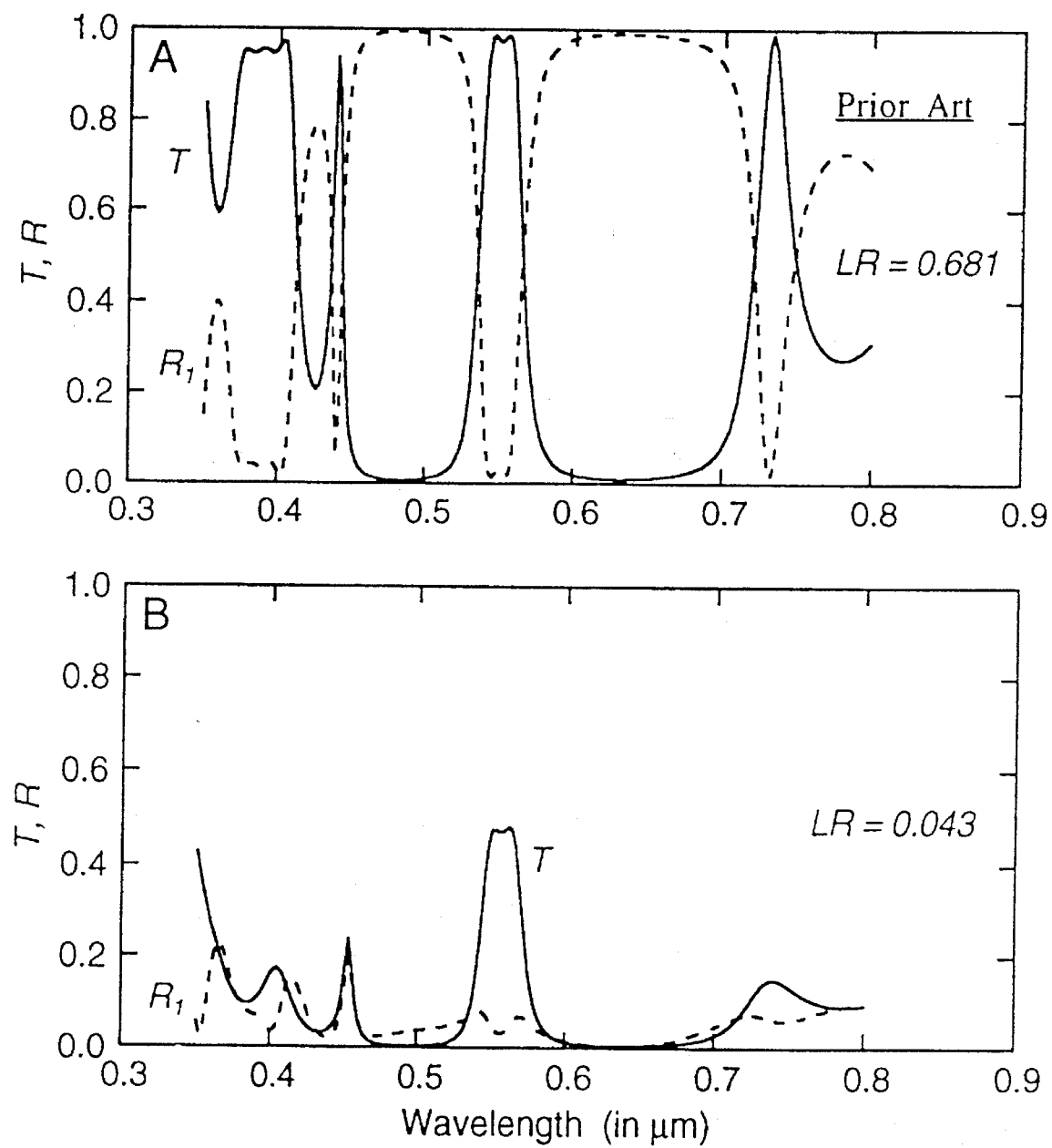
FIGS. 8A and 8B show, respectively, prior art and inventive filters based on two cavity all-dielectric bandpass filters.

FIG. 3 shows the comparable situation for a known, all-dielectric interference filter based on thin films. The transmission band shown in FIG. 3A is idealized, having a narrow passband with T=1.0 and $R_1$=0.0. Outside this narrow wavelength region T=0.0 and $R_1$=1.0, so only light of the colour emitted by the display device passes through the filter 13. Such filters have a mirror-like appearance which makes it difficult to see the required display if there is stray light in the viewing area. FIG. 3B shows the ambient light beam after reflection from the surface 15 ($TR_2$=0.9), and FIG. 3C shows the beam after it has passed a second time through the filter ($T^2R_2$=0.81). FIG. 3D shows the final combined reflected light beams ($R_0+R_1+T^2R_2$). It will be seen that, with the exception of a small fraction of the light in the transmission band, all the ambient illuminance is reflected back towards the observer and thus is a serious impediment to the viewing of the screen.

FIG. 4 shows the comparable situation with the present invention. Here, the transmittance T of the filter is 0.5 in the bandpass and 0.0 outside it. The reflectance $R_1$ is equal to 0.0 throughout the spectral range shown (FIG. 4A). When all the components are combined, as in FIG. 4D, $(R_0+R_1+T^2R_2)$ will be equal to 0.22 and 0.0 within and outside the bandpass, respectively. The ambient illuminance reflected back towards the observer will be seen to be a fraction of that shown in FIG. 3D.

If one assumes that the luminance of the inactive pixel $L_{off}$ is small compared to $L_{on}$, the luminance of the active pixel, and to the ambient illuminance reflected back to the observer, it follows from Equation (1) that a large improvement in the contrast ratio CR is to be expected through the application of the new ad.

The above discussion relates to ideal situations where thin films can produce sharply defined profiles, complete suppression of reflection, etc, but such a situation does not occur in practice. FIGS. 5B, 6B, 7B, and 8B show the kind of practical results which can be achieved with Applicants' invention. The corresponding FIGS. 5A–8A. show the comparable situation with prior art interference filters. The results shown in these figures are obtained with thin film combinations shown in the table attached hereto as Table 1. The graphs relate to metal-dielectric and all-dielectric bandpass systems. These will now be discussed.

Prior art—FIGS. 5A, 6A, 7A and 8A

Metal-dielectric bandpass filters are the simplest thin film bandpass filters. They consist of a dielectric layer (sometimes called a cavity or a spacer layer) that is surrounded on either side by partially transparent, highly reflecting metal layers. Transmission peaks of this structure occur at wavelengths $\lambda_0$ at which the sum of the optical thickness of this layer and the phase changes on reflection at the interfaces of the two reflecting metal layers with the spacer layer are equal to integral multiples of $\lambda_0/2$. These filters act, in fact, like very low order Fabry-Perot interferometers. Their spectral transmission bands have rather triangular-looking Airy profiles, which are not the best shape for many filtering problems. The transmission band can be made to assume squarer profiles by constructing somewhat more complex multilayer structures consisting of two or more cavities. Because metal layers absorb, the transmittance T at the peak of a metal-dielectric bandpass filter is usually considerably less than unity. For the same reason, the reflectance R and absorptance A are different for light incident from the medium and the substrate sides.

In FIGS. 5A and 6A are shown the calculated spectral characteristics of a single and a double-cavity metal-dielectric bandpass filter. It will be seen that the spectral reflectance $R_1$ is quite high throughout the spectral range shown, with the exception of the bandpass regions. Conversely, the transmittance T is low at all wavelengths except at those which correspond to the first and higher order transmission bands. Note that, at any wavelength, the sum of the transmittance T and the reflectance R is not equal to unity. The difference is equal to the absorptance within the metal layers.

Also shown in FIG. 5A is the visibility curve, $V_\lambda$ (dotted curve). This curve represents the sensitivity of the human eye to light of different wavelengths. An integral quantity, the luminous reflectance LR, takes into account this variation in sensitivity and is a good measure of the effectiveness of a multilayer for visual use. The calculated values of LR for each filter are shown in the figures.

The most common forms of all-dielectric bandpass filters are simple analogies of the metal-dielectric systems described above, in which the partially transparent metal reflecting layers are replaced by all-dielectric reflecting stacks. These are composed of alternate high and low refractive index films, each having an optical thickness of a quarter wave at the wavelength $\lambda_0$ at which a transmission peak is desired.

In FIGS. 7A and 8A are shown the calculated spectral characteristics of a single and a double cavity all-dielectric bandpass filter. There are two essential differences between metal-dielectric and all-dielectric bandpass filters. All-dielectric reflectors have a high reflectance in a narrower spectral region. For this reason the transmittance rises on both the long and the short wavelength sides of the main transmission peak. The rejection regions of all-dielectric bandpass filters are therefore much narrower than those of the metal-dielectric bandpass filters. The second difference is that the sum of the transmittance and the reflectance of the filter is equal to unity throughout the spectral region in which the dielectric coating materials are non-absorbing.

FIGS. 5B, 6B, 7B and 8B

To remove the unwanted reflected light and at the same time transmit only a narrow band of the spectrum implies that the black bandpass filter structure must contain absorbing materials. The immediate consequence of this is that the peak transmittance of the bandpass filter must be less than unity. This is the trade-off that one must accept. A suitable goal is a peak transmittance of the order of 0.5 of the transmittance of a conventional bandpass filter. This is not unreasonable, since in most other approaches to display contrast enhancement a similar loss is introduced and accepted.

Shown in FIGS. 5B and 6B are two metal-dielectric filters with relative spectral transmission characteristics that are similar to those shown in FIGS. 5A and 6A. However, there is a big difference in the reflectance curves. For light incident from the observer's side, the reflectance values are small. Note that the reflectance $R_1$ is lowest at wavelengths that correspond to high values of the $V_\lambda$ curve. $R_1$ exceeds the value of 0.2 only at wavelengths that are lower than 0.45 μm or higher than 0.69 μm. However, a limit of 0.65 would also be acceptable. At these wavelengths the values of $V_\lambda$ are less than 0.03 and therefore these reflectances no longer contribute significantly to the luminous reflectance LR. Note that, as a result, the luminous reflectances of the black bandpass filters of FIGS. 5B and 6B are approximately one order of magnitude smaller than those of the conventional designs.

In FIG. 5B, which is typical, the passband $\delta\lambda$, for which the transmittance is greater than 0.2, extends from 0.54 μm to 0.56 μm. It is a small fraction of the width of a first broad wavelength band $\Delta\lambda$ (from 0.48 μm to 0.67 μm) over which the reflectance has been reduced to less than 0.1, and is preferably less than one quarter of $\Delta\lambda$. As is also clear from FIG. 5B, this passband is an even smaller fraction of a second broad wavelength band over which transmittance is less than 0.2, and which extends from less than 0.4 μm to more than 0.65 μm. These two broad wavelength bands cover all parts of the visible spectrum in which, as shown by the $V_\lambda$ curve in FIG. 5A, the eye's sensitivity is significant. It will also be seen from FIG. 5B that the transmittance T outside the passband is held to less than 0.1 over the large majority of the visible spectrum.

In FIGS. 7B and 8B are shown the corresponding curves for new art filters that are based on prior art all-dielectric bandpass filters. As will appear from consideration of Table 1, discussed below, these new art filters all include at least one layer of metal, such as Inconel. Once again, except for a scaling factor, the main transmission peaks resemble closely the transmission peaks of FIGS. 7A and 8A and the reflectance curves are much reduced.

Filters similar to those shown in FIGS. 5B–8B with passbands centered at other wavelengths and having different widths $\delta\lambda$, $\Delta\lambda$ can be constructed in the ultraviolet, visible and infrared spectral regions.

The construction parameters of all the multilayers shown in FIGS. 5–8 are given in Table 1. In all systems the substrate and the medium were BK7 glass and air, respectively. The designs therefore correspond to the arrangement shown in FIG. 1B. For simplicity, only two dielectric coating materials ($SiO_2$, $Nb_2O_3$) and two metals (Ag, Inconel) were used in all designs. Dielectric materials, such as $Al_2O_3$, $ZrO_2$, $HfO_2$, $Sc_2O_3$, $TiO_2$, ITO, $La_2O_3$, MgO, $Ta_2O_5$, $ThO_2$, $Y_2O_3$, $CeO_2$, $AlF_3$, $CeF_3$, $Na_3AlF_6$, $LaF_3$, $MgF_2$, $ThF_4$, ZnS, $Sb_2O_3$, $Bi_2O_3$, $PbF_2$, $NdF_3$, $Nd_2O_3$, $Pr_6O_{11}$, SiO, NaF, ZnO, LiF, $GdO_3$, or others known to those skilled in the art could be used with equal effect. In the examples Inconel was used because its properties are well-known and because it forms very tough, environmentally stable films. However, it too could be replaced by metals such as Al, Cu, Au, Mo, Ni, Pt, Rh, Ag, W, Cr, Co, Fe, Ge, Hf, Nb, Pd, Re, V, Si, Se, Ta, Y, Zr, as well as alloys of these materials such as Nichrome and the like, or by any strongly absorbing oxide of the above or other metals.

The multilayer designs were obtained by using a modified flip-flop thin film synthesis program in which multilayer structures consisting of two dielectric materials and one metal could be appended to a given design. The program is described in a paper by J. A. Dobrowolski and R. A. Kemp, entitled "Flip-flop Thin-Film Design Program with Enhanced Capabilities", Appl. Opt. 31, 3807–3812 (1992). In that program it was possible to specify transmittance, reflectance and absorptance for any wavelength. All the layers of the systems obtained in this way were then refined to optimize the performance using a program in which not only the above spectral characteristics, but also the luminous reflectance of the multilayer could be specified.

Concluding remarks

The above discussion describes only black bandpass filters that are based on the two most important types of thin film bandpass filter structures. The procedures outlined above could be applied to produce black bandpass filters based on other filter types. For example, a hybrid bandpass filter type exists in which the reflectors consist of both partially transparent metal layers and dielectric quarter wave layers. The properties of such hybrid bandpass filters are intermediate to those of the metal-dielectric and all-dielectric types. For the description of yet other thin film bandpass designs, the reader is referred to the article "Coatings and Filters" in the "Handbook of Optics", (eds. W. G. Driscoll and W. Vaughan) (McGraw-Hill, New York, 1978), pp. 8.1–8.124.

The above discussion has been limited to bandpass filters with a single transmission peak. However, those practiced in the art will appreciate that it is possible with the above approach to design black bandpass filters with several transmission bands, to accommodate colour display devices.

It will be also obvious to those skilled in the art that, using the methods outlined above, it is possible to construct filters for other than the visible part of the spectrum substantially transmitting the radiation incident upon it in one narrow spectral region, and suppressing its reflection in broad spectral regions on either side of the transmission band. In particular, filters based on the above methods are possible in the ultraviolet and infrared, although some of the materials used for their construction may be different.

The discussion has been centred on the use of black bandpass filters in display devices. There are also other applications for such filters, two of which are briefly mentioned below.

In optical communications, radiation of several wavelengths, each carrying a different signal, is combined by a multiplexer into a single beam for transmission through free space or in a fiber-optic bundle. At the destination the beam is separated once again into separate channels by a demultiplexer. In some multiplexers and demultiplexers narrowband filters centered on the different wavelengths are used for the clean-up of the signals. The use of filters which do not reflect the incident radiation will reduce the noise in the other channels.

In optical surveillance instruments detect laser light or infrared radiation used by the subjects under observation. It is desirable to do this in a manner which will not alert them to the fact that they are being observed. Hence, once again, there is a need for narrowband filters that do not reflect the incoming radiation.

TABLE I

Construction parameters of filter shown in FIGS. 5–8

| Figure No. | 5A | | 5B | | 6A | | 6B | |
|---|---|---|---|---|---|---|---|---|
| Layer No. Substrate | material BK7 | t (in μm) | material BK7 | t (in μm) | material BK7 | t (in μm) | material BK7 | t (in μm) |
| 1 | Ag | 0.0364 | Ag | 0.0364 | Ag | 0.0224 | Ag | 0.0151 |
| 2 | $SiO_2$ | 0.1406 | $SiO_2$ | 0.1392 | $SiO_2$ | 0.1420 | $SiO_2$ | 0.1400 |
| 3 | Ag | 0.0367 | Ag | 0.0367 | Ag | 0.0478 | Ag | 0.0425 |
| 4 | $SiO_2$ | 0.1132 | $Nd_2O_5$ | 0.0279 | $SiO_2$ | 0.1415 | $SiO_2$ | 0.1410 |
| 5 | | | Inconel | 0.0070 | Ag | 0.0182 | Ag | 0.0265 |
| 6 | | | $Nb_2O_5$ | 0.0165 | $SiO_2$ | 0.1430 | $SiO_2$ | 0.0949 |
| 7 | | | $SiO_2$ | 0.1003 | | | Inconel | 0.0059 |
| 8 | | | $Nb_2O_5$ | 0.0905 | | | $SiO_2$ | 0.1879 |
| 9 | | | $SiO_2$ | 0.0685 | | | Inconel | 0.0033 |
| 10 | | | | | | | $SiO_2$ | 0.0785 |
| medium | air | | air | | air | | air | |

| Figure No. | 7A | | 7B | | 8A | | 8B | |
|---|---|---|---|---|---|---|---|---|
| Layer No. Substrate | material BK7 | t (in μm) | material BK7 | t (in μm) | material BK7 | t (in μm) | material BK7 | t (in μm) |
| 1 | $Nb_2O_5$ | 0.0586 | $Nb_2O_5$ | 0.0050 | $Nb_2O_5$ | 0.0586 | $Nb_2O_5$ | 0.0594 |
| 2 | $SiO_2$ | 0.0941 | $SiO_2$ | 0.0974 | $SiO_2$ | 0.0941 | $SiO_2$ | 0.0988 |
| 3 | $Nb_2O_5$ | 0.0586 | $Nb_2O_5$ | 0.0543 | $Nb_2O_5$ | 0.0586 | $Nb_2O_5$ | 0.0327 |
| 4 | $SiO_2$ | 0.0941 | $SiO_2$ | 0.0979 | $SiO_2$ | 0.1883 | $SiO_2$ | 0.2311 |
| 5 | $Nb_2O_5$ | 0.0586 | $Nb_2O_5$ | 0.0423 | $Nb_2O_5$ | 0.0586 | $Nb_2O_5$ | 0.0397 |
| 6 | $SiO_2$ | 0.1883 | $SiO_2$ | 0.1325 | $SiO_2$ | 0.0941 | $SiO_2$ | 0.1106 |
| 7 | $Nb_2O_5$ | 0.0586 | $Nb_2O_5$ | 0.0439 | $Nb_2O_5$ | 0.0586 | $Nb_2O_5$ | 0.0565 |
| 8 | $SiO_2$ | 0.0941 | $SiO_2$ | 0.2159 | $SiO_2$ | 0.0941 | $SiO_2$ | 0.1065 |
| 9 | $Nb_2O_5$ | 0.0586 | $Nb_2O_5$ | 0.0436 | $Nb_2O_5$ | 0.0586 | $Nb_2O_5$ | 0.0493 |
| 10 | $SiO_2$ | 0.0941 | $SiO_2$ | 0.1095 | $SiO_2$ | 0.0941 | $SiO_2$ | 0.1180 |
| 11 | $Nb_2O_5$ | 0.0586 | $Nb_2O_5$ | 0.0538 | $Nb_2O_5$ | 0.0586 | $Nb_2O_5$ | 0.0644 |
| 12 | $SiO_2$ | 0.0941 | $SiO_2$ | 0.0957 | $SiO_2$ | 0.1883 | $SiO_2$ | 0.1791 |
| 13 | | | $Nb_2O_5$ | 0.0018 | $Nb_2O_5$ | 0.0586 | $Nb_2O_5$ | 0.0530 |
| 14 | | | Inconel | 0.0174 | $SiO_2$ | 0.0941 | $SiO_2$ | 0.0992 |
| 15 | | | $Nb_2O_5$ | 0.0274 | $Nb_2O_5$ | 0.0586 | $Nb_2O_5$ | 0.0072 |
| 16 | | | $SiO_2$ | 0.1165 | $SiO_2$ | 0.0941 | Inconel | 0.0107 |
| 17 | | | $Nb_2O_5$ | 0.0807 | | | $Nb_2O_5$ | 0.0425 |
| 18 | | | $SiO_2$ | 0.0695 | | | $SiO_2$ | 0.1204 |
| 19 | | | | | | | Inconel | 0.0083 |
| 20 | | | | | | | $Nb_2O_5$ | 0.0217 |
| 21 | | | | | | | $SiO_2$ | 0.0085 |
| medium | air | | air | | air | | air | |

We claim:

1. An optical filter for suppressing unwanted reflections of ambient radiation incident on an optical apparatus comprising one of a display device, a cathode ray tube, an electroluminescent screen, an optical communications equipment, an a surveillance equipment, said optical apparatus having an outer surface for facing the incident ambient radiation, said filter comprising a single substrate having multiple thin layers deposited thereon;

wherein said layers include a first series of layers for suppressing reflections of ambient radiation incident onto the outer surface of the filter and a second series of layers constituting a bandpass interference filter;

said first series of layers being arranged to suppress reflection of the incident ambient radiation over a first broad wavelength band, said first series of layers containing at least one layer comprising a metal selected from the group consisting of Al, Cu, Au, Mo, Ni, Pt, Rh, Ag, W, Ag, Cr, Co, Fe, Ge, Hf, Nb, Pd, Re, V, Si, Se, Ta, Y, Zr, their alloys Inconel, and Nichrome;

said second series of layers being arranged to suppress transmittance to less than 0.1 of the incident radiation over most of a second, broad wavelength band while allowing transmittance of an amount of at least 0.2 of the incident radiation over a relatively narrow wavelength passband; and both said first and second broad wavelength bands covering most of the visible spectrum and being substantially broader than and encompassing said relatively narrow wavelength passband which narrow passband is a small fraction of the width of the broad wavelength bands, the reflectance throughout said first broad wavelength band being less than 0.1.

2. An optical filter according to claim 1, wherein said multiple thin layers are formed on an inner surface of said substrate, being that surface which is farthest away from the incident ambient radiation.

3. An optical filter according to claim 2, wherein said first broad wavelength band extends from about 0.45 to about 0.65 µm, and wherein the said relatively narrow wavelength passband occurs between 0.45 and 0.65 µm.

4. An optical filter according to claim 3, wherein said second series of layers contain at least one layer made of a dielectric material selected from the group consisting of $Al_2O_3$, $ZrO_2$, $HfO_2$, $Sc_2O_3$, $TiO_2$, ITO, $La_2O_3$, MgO, $Ta_2O_5$, $ThO_2$, $Y_2O_3$, $CeO_2$, $AlF_3$, $CeF_3$, $Na_3AlF_6$, $LaF_3$, $MgF_2$, $ThF_4$, ZnS, $Sb_2O_3$, $Bi_2O_3$, $PbF_2$, $NdF_3$, $Nd_2O_3$, $Pr_6O_{11}$, SiO, NaF, ZnO, LiF and $GdO_3$.

5. An optical filter according to claim 2, wherein said second series of layers contain at least one layer made of a dielectric material selected from the group consisting of $Al_2O_3$, $ZrO_2$, $HfO_2$, $Sc_2O_3$, $TiO_2$, ITO, $La_2O_3$, MgO, $Ta_2O_5$, $ThO_2$, $Y_2O_3$, $CeO_2$, $AlF_3$, $CeF_3$, $Na_3AlF_6$, $LaF_3$, $MgF_2$, $ThF_4$, ZnS, $Sb_2O_3$, $Bi_2O_3$, $PbF_2$, $NdF_3$, $Nd_2O_3$, $Pr_6O_{11}$, SiO, NaF, ZnO, LiF and $GdO_3$.

6. An optical filter according to claim 1, wherein said multiple thin layers are formed on the outer surface of the screen of a display device.

7. An optical filter according to claim 6, wherein said first broad wavelength band extends from about 0.45 to about 0.65 µm, and wherein the said relatively narrow wavelength passband occurs between 0.45 and 0.65 µm.

8. An optical filter according to claim 6, wherein said second series of layers contain at least one layer made of a dielectric material selected from the group consisting of $Al_2O_3$, $ZrO_2$, $HfO_2$, $Sc_2O_3$, $TiO_2$, ITO, $La_2O_3$, MgO, $Ta_2O_5$, $ThO_2$, $Y_2O_3$, $CeO_2$, $AlF_3$, $CeF_3$, $Na_3AlF_6$, $LaF_3$, $MgF_2$, $ThF_4$, ZnS, $Sb_2O_3$, $Bi_2O_3$, $PbF_2$, $NdF_3$, $Nd_2O_3$, $Pr_6O_{11}$, SiO, NaF, ZnO, LiF and $GdO_3$.

9. An optical filter according to claim 1, wherein the width of the relatively narrow wavelength passband is less than one quarter that of the first broad wavelength band.

10. An optical filter according to claim 9, wherein said first broad wavelength band extends from about 0.45 to about 0.65 µm, and wherein the said relatively narrow wavelength passband occurs between 0.45 and 0.65 µm.

11. An optical filter according to claim 9, wherein said second series of layers contain at least one layer made of a dielectric material selected from the group consisting of $Al_2O_3$, $ZrO_2$, $HfO_2$, $Sc_2O_3$, $TiO_2$, ITO, $La_2O_3$, MgO, $Ta_2O_5$, $ThO_2$, $Y_2O_3$, $CeO_2$, $AlF_3$, $CeF_3$, $Na_3AlF_6$, $LaF_3$, $MgF_2$, $ThF_4$, ZnS, $Sb_2O_3$, $Bi_2O_3$, $PbF_2$, $NdF_3$, $Nd_2O_3$, $Pr_6O_{11}$, SiO, NaF, ZnO, LiF and $GdO_3$.

12. An optical filter according to claim 1, wherein said first broad wavelength band extends from about 0.45 to about 0.65 µm, and wherein the said relatively narrow wavelength passband occurs between 0.45 and 0.65 µm.

13. An optical filter according to claim 1, wherein said second series of layers contain at least one layer made of a dielectric material selected from the group consisting of $Al_2O_3$, $ZrO_2$, $HfO_2$, $Sc_2O_3$, $TiO_2$, ITO, $La_2O_3$, MgO, $Ta_2O_5$, $ThO_2$, $Y_2O_3$, $CeO_2$, $AlF_3$, $CeF_3$, $Na_3AlF_6$, $LaF_3$, $MgF_2$, $ThF_4$, ZnS, $Sb_2O_3$, $Bi_2O_3$, $PbF_2$, $NdF_3$, $Nd_2O_3$, $Pr_6O_{11}$, SiO, NaF, ZnO, LiF and $GdO_3$.

14. An optical filter according to claim 1, wherein the second broad wavelength band extends from less than 0.4 µm to more than 0.65 µm.

15. An optical filter according to claim 1, wherein said substrate is adapted to fit said optical apparatus.

\* \* \* \* \*